350-330 SR
4/15/80    XR    4,198,647

United States Patent [19]
Grinberg et al.

[11]  4,198,647
[45]  Apr. 15, 1980

[54] HIGH RESOLUTION CONTINUOUSLY DISTRIBUTED SILICON PHOTODIODE SUBSTRATE

[75] Inventors: Jan Grinberg, Los Angeles; Alexander D. Jacobson, Topanga; William P. Bleha, Jr., Carlsbad; Paul O. Braatz, Los Angeles, all of Calif.

[73] Assignee: Hughes Aircraft Company, Culver City, Calif.

[21] Appl. No.: 4,107

[22] Filed: Jan. 17, 1979

Related U.S. Application Data

[63] Continuation of Ser. No. 792,842, May 2, 1977, abandoned.

[51] Int. Cl.² .................................... H01L 27/14
[52] U.S. Cl. ........................... 357/30; 357/58; 350/330; 350/332; 350/342
[58] Field of Search ............... 357/30, 58; 350/331, 350/332, 342, 330

[56] References Cited

U.S. PATENT DOCUMENTS

| | | | |
|---|---|---|---|
| 3,126,483 | 3/1964 | Hoalst | 350/83.3 |
| 4,032,954 | 6/1977 | Grinberg | 357/30 |
| 4,093,357 | 9/1978 | Grinberg | 350/338 |
| 4,114,991 | 6/1978 | Grinberg | 350/338 |

*Primary Examiner*—Martin H. Edlow
*Attorney, Agent, or Firm*—G. L. Cline; W. H. MacAllister; G. Tacticos

[57] ABSTRACT

This invention is directed to a semiconductor structure that includes at least one wafer that is fully depleted of all mobile carriers and is used as a medium for the movement of spatially modulated signal represented by charge carriers through the wafer with a spatial resolution that is smaller than the thickness of the wafer. This may be used in the form of a continuous high resolution silicon photodiode substrate to serve as an image input means for an electro-optical display medium, such as a liquid crystal. Next to the photoactivated substrate is a liquid crystal and next to the crystal is a transparent electrode. The photodiode is reverse biased and both of its sides are depleted of all mobile charges throughout its entire thickness. Thus, charges generated in the substrate move to the display not by diffusion as in prior art devices (e.g. the solid state silicon vidicon) but by the influence of the electric field which tends to minimize their lateral spread and thereby achieves a high spatial resolution in spite of the continuous character of this silicon diode device.

15 Claims, 4 Drawing Figures

HIGH RESOLUTION CONTINUOUSLY DISTRIBUTED SILICON PHOTODIODE SUBSTRATE

This is a continuation of co-pending application Ser. No. 792,842 filed May 2, 1977, now abandoned.

FIELD OF THE INVENTION

This invention relates generally to a charge transfer structure and more particularly to a charge storage and transfer photodiode to be used in combination with a liquid crystal in a liquid crystal light valve apparatus, in which a matrix of photogenerated carriers representing signals created at the backside of the silicon substrate can be transferred across the thickness of the wafer, and efficiently collected on the other side, while maintaining the signal spatial resolution.

BACKGROUND OF THE INVENTION

U.S. Pat. No. 3,824,002 issued to Terry D. Beard, entitled "Alternating Current Liquid Crystal Light Valve" and assigned to the present assignee discloses the basic principles of operation of an alternating current liquid crystal light valve which requires that a photoconductor be impedance-matched to the liquid crystal, the photocapacitance of the photoconductor being modulated in response to an input light.

U.S. Pat. No. 3,976,361 issued to Fraas et al entitled "Charge Storage Diode with Graded Defect Density Photocapacitive Layer" and assigned to the present assignee discloses a different photoconductor for a similar light valve. The photoconductor consists of a charge storage semiconductor diode with a graded band gap layer increasing the optical absorption coefficient of the region near the rectifying junction to permit the storage of charge.

U.S. patent application Ser. No. 691,652 filed on June 1, 1976, by Jan Grinberg et al, entitled "Silicon Single Crystal Charge Storage Diode" and assigned to the present assignee describes a species of the generic invention of U.S. Pat. No. 3,976,361. This invention presently stands allowed and will issue in due course. It discloses a charge storage photodiode silicon substrate which is doped with a slow recombination center element such as silver, to combine the advantages of a highly developed silicon manufacturing technology with the high liquid crystal stability under ac operating conditions. The inventions disclosed and claimed in the aforementioned patents and patent application represent significant advances in this art as explained in detail in said patents and patent application. Our invention extends the developments in this area of technology and incorporates a concept that has applications extending considerably beyond the area of liquid crystal light valves.

For example, some of the present photoactive liquid crystal light valves made according to the teachings of U.S. Pat. No. 3,976,361 use a thin film of CdS which is driven with alternating current. The photodetector acts as a light-activated voltage gate. The thin film structure is designed to accept the major portion of the drive voltage when the photoconductor is unilluminated; the portion of the voltage that falls across the liquid crystal is below the threshold for activation of the liquid crystal electro-optic effect. When light falls on the photoconductor, its impedance drops, thereby switching the voltage from the photoconductor onto the liquid crystal and driving the liquid crystal into its activated state. Due to the high lateral impedance of the thin films, there is very little spread of the light and of its concomitant liquid crystal electro-optic effect. As a result, the light activation process is a high resolution process, so that the device can accept photographic quality images for transfer to an intense beam of light. Among the limitations of such a structure include relatively low switching ratios, undesirable memory effects and relatively slow response time. The switching ratio is defined as the ratio of the current through the light valve in the photoactivated state to the light valve current at the dark threshold. The fastest CdS photodetector is limited to a switching ratio of approximately 2:1, while a fast liquid crystal response time requires switching ratios in excess of 5:1. Furthermore, the sensitivity of the CdS photodetector is such that the primary image source has to be driven hard, which can cause resolution degradation, loss of contrast and an unnecessary system complexity.

SUMMARY OF THE INVENTION

The general purpose of this invention is to provide a structure through which many charge carriers representing signals can pass without cross-coupling between adjoining signals.

To accomplish this purpose, we have provided a novel semiconductor apparatus for the transfer of a plurality of signals in the form of minority carriers from one surface of a semiconductor body to the opposite through the use of a depletion region while maintaining their spatial resolution. The structure comprises a semiconductor body characterized by two opposite major surfaces and means for establishing an electric field between the two surface of an intensity that is sufficient to deplete this semiconductor body of all mobile charge carriers. There are further means for introducing in one of the two major surfaces minority charge carriers which move to the opposite second surface under the influence of the electric field.

In one embodiment of this invention, the semiconductor body can be silicon having a resistivity greater than 100 $\Omega$-cm. The thickness of this body, that is the distance between the two major surfaces, can be anywhere from one thousandth of an inch to one inch. Therefore, the silicon wafer must be relatively pure, close to intrinsic and the wafer thickness can be relatively high.

There are several ways of creating an electric field across a relatively resistive and relatively thick silicon wafer to deplete of all mobile charges. One such way is the formation of a pn junction in the wafer and backbiasing this junction whereupon both sides of the diode can be depleted of charges.

Although in one embodiment of this invention a silicon wafer film is used for the semiconductor body, other semiconductor material can also be used for the transfer medium. In addition, the silicon (or other semiconductor) body can be fabricated on an insulating substrate such as sapphire. For example, large area silicon diodes can be built epitaxially on a sapphire layer. A high resistivity semiconductor has been used before for the propagation medium of a beam. For example, U.S. Pat. No. 3,593,045 issued to Bartelink et al, discloses such a use. Bartelink teaches the depletion of a semiconductor region of all mobile charges due to impurities and then the introduction and transfer of a beam of charges through the depleted medium. The beam of charges is then deflected by a traverse electric or magnetic field as in a CRT. The present invention also uses a depletion region to move minority carriers across a substrate under the influence of a longitudinal electric field. However, the present invention uses an array of mxn charge beams to transfer mxn signals of information across a substrate.

In other prior art applications, efforts were made to move charges across a silicon wafer with a resistivity of 1–10 Ω-cm. With materials of that low resistivity, the depletion region is very thin (typically a few μm for a few tens of a volt), and the field extends to only a portion of the width of the wafer. In these situations, the spreading of the charge signals is typically twice the wafer's width. In our structure, it is possible to deplete the wafer of all mobile charges along its entire width. In order to accomplish this, without exceeding the theoretical breakdown limit of the material, we used a semiconductor material with a high resistivity in the range of 3–40 kΩ-cm (almost intrinsic). In this situation, the expected signal spreading will be approximately $L = 2W\sqrt{KT/eV}$ where $KT/e = 26$ MV for room temperature and W is the wafer thickness. Therefore, with the application of a voltage of 26 V across the wafer, the spreading of the charge signals will be approximately $L = (2W/\sqrt{1000})$ which means less spreading by a factor of over 31 ($\sqrt{1000}$) over the prior art devices.

One particular application of this concept is in the area of electro-optical liquid crystal light valves. A large junction area high resolution silicon photodiode substrate can be used as an image input means for an electro-optical display medium, such as a liquid crystal.

Accordingly, it is an object of this invention to provide a scheme for the transfer of a bundle of charge carriers representing signals simultaneously and in parallel from one surface of a semiconductor substrate to the opposite under the influence of an electric field with good spatial resolution.

It is another object of this invention to provide a high resistivity substrate which is depleted of all mobile carriers and permits the transfer of minority carriers, representing different signals, from one of its surfaces to the opposite surface without cross coupling and a minimum of noise.

It is another object of this invention to form a continuous large area pn junction on a substrate of high resistivity silicon thin film silicon substrate and through reverse biasing this junction to form a depletion region extending through the entire width of the substrate so that a spatially resolved pattern of minority charges can drift from one surface of the substrate to the opposite under the influence of the electric field set up across the junction without lateral spreading drift through diffusion. The minority carriers can be introduced by optical images, ex-rays, high energy electrons and anything else that can generate or inject minority carriers.

It is another object of the present invention to form a large area high resolution silicon photodiode substrate to serve as an image input means for our electro-optical display medium, such as a liquid crystal. The silicon structure will have a very high lateral resistivity.

It is another object of this invention to provide a silicon substrate for a liquid crystal light valve operated in the dc mode having the advantages of higher switching ratios and higher voltages than are obtainable from the ac mode CdS photosensitive substrates.

These and other object of the invention will become more fully apparent in the following description of the accompanying drawings.

DETAILED DESCRIPTION OF THE DRAWINGS

Figure 1:
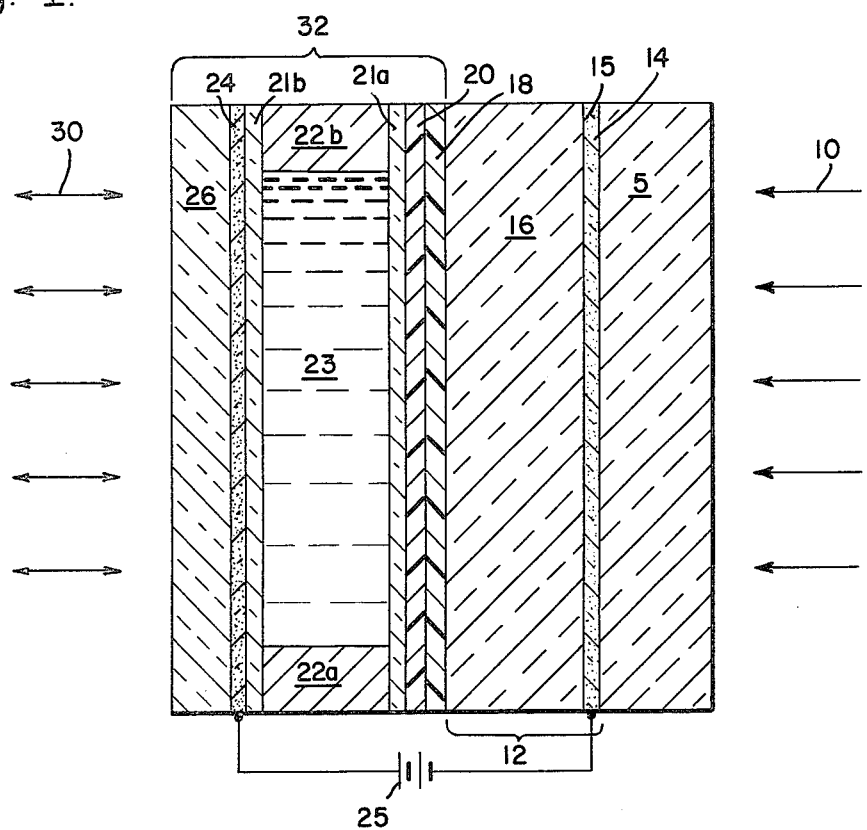
FIG. 1 is a diagrammatic cross sectional view of a liquid crystal light valve structure with a silicon photodiode constructed in accordance with the present invention.

Referring now to FIG. 1, there is shown a direct current liquid crystal light valve with a photodiode built in accordance with the present invention. It includes a substrate 5 that is transparent to incident light 10. Next to the substrate 5 is a silicon photodiode 12. It has a thin p layer 14, a relatively thick n layer 16 and a pn junction 15. In a test unit of one embodiment, the thin p layer had a thickness of 0.2μ and a resistivity of 0.02Ω-cm. This layer is highly conductive and in addition to being the p-side of a pn junction, it is also used as an electrode for the diode. The adjacent layer 16 is n type relatively thicker and highly resistive. In one embodiment, this layer was 5 mil thick and had a resistivity of 3000 Ω-cm.

Next to the photodiode is the liquid crystal and its electrodes and interface layers all together shown as 32. A series of interface layers for blocking the readout light from the silicon photodiode and for providing a reflective surface for readout. Silicon is photosensitive up to the near infrared. In order to provide light blocking for silicon, a material with a band gap equal to or smaller than silicon's band gap must be employed. Such a material will not have sufficient sheet resistivity to maintain high resolution, if its mobility is within an order of magnitude of the mobility in silicon. Therefore, it is difficult to find a single phase material that provides adequate light blocking and at the same time high enough sheet resistivity to maintain the required resolution. Therefore, a two phase material called cermet, and consisting of metallic and dielectric components can be used. Such a thin film blocking layer can be built by imbedding small metal particles in a dielectric layer. The metal particles are insulated from each other by the dielectric. It is known that many metals, such as Sn, In and Pb tend to form islands, instead of continuous films, when deposited in very thin (200 Å) films. Such a multilayer structure will have a high sheet resistivity because the metal particles are insulated from each other in the plane of the film. However, in a direction perpendicular to the film plane, the resistivity is low because the thin interleaving insulator films allow tunneling or high electric field injection of electrons beetween metal particles in neighboring metal island films. Thus, the observed perpendicular resistivity is low with respect to that in the plane of the film and a dc current can then flow through the entire film structure with no transverse spreading. Such a cermet film is shown in layer 18.

Next to layer 18 is a cermet mirror 20. This consists of high and low index dielectric layers deposited with a small concentration of metal. They provide a large dc conductivity anisotropy between the insulator-like sheet resistance and the low resistance through the film. Hence, the light valve can operate in the reflective mode.

The cermet light blocking layer 18 and mirror 20 are disclosed and claimed in our U.S. Pat. No. 4,109,357 issued June 6, 1978, entitled "Cermet Interface for Electro-Optical Devices" to Jan Grinberg et al and assigned to the Hughes Aircraft Company. Other types of light blocking layers may also be used in conjunction with the present invention.

A liquid crystal 23 is adjacent the cermet mirror 20, and between two passivating films 21a and 21b. The thickness of the liquid crystal 23 is determined by spacers 22a an 22b. Next to the passivating film 21b is a transparent conducting electrode 24. A battery 25 is connected between electrode 24 and the p side of the photodiode. Voltage V is selected to reverse bias the pn junction of the photodiode and establish a depletion region that extends from either side of the junction to the entire silicon substrate around the junction. When the minority carriers are introduced on the p side of the junction, they will diffuse in this highly conductive region towards the junction. Since the pn junction is reverse biased, it will collect the minority carriers and insert them (from a high output impedance) into the interface layers and the liquid crystal. The spatial resolution of the carriers is maintained because in the depleted region, the potential is determined by the space charge and not by current flow. Therefore, there is no lateral field in the region.

Figure 2:
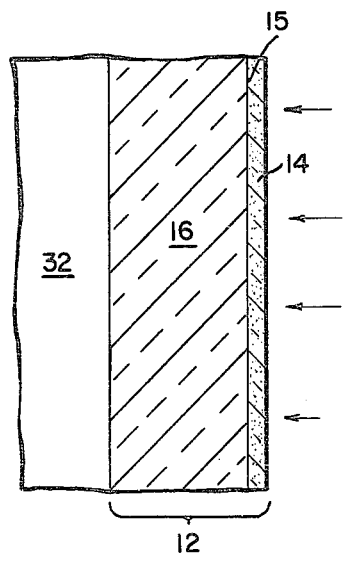
FIG. 2 is one embodiment of a photodiode constructed in accordance with the present invention. It can be used in a liquid crystal light valve arrangement as that shown in FIG. 1.

In FIG. 2, there is shown one embodiment of a structure disclosed and claimed in the present invention. It includes a relatively thin layer 14, at the input, a relatively thick layer 16 and a pn junction 15 between them. Next to the thick layer 16, there is shown a portion of a liquid crystal and its associated light blocking interface layers 32. The thin layer 14 can be undepleted of charges during the operation, if its thickness and conductivity permit the incoming signals to reach the depleted side 16 without substantial signal spreading. For example, if radiation is used to produce the signal charges, then the undepleted region must be thinner than the desired resolution. Alternatively, the undepleted region can be made so that it does not absorb the incoming radiation.

For example, layer 16 can have a resistivity on the order of 10 K $\Omega$-cm, while the undepleted region 14 may have a resistivity in the range between 1 and 10 $\Omega$-cm. With such a high conductivity layer in the input side, there is no need for an extra electrode on that side for the biasing of the photodiode since an electrical connection can be made directly through layer 14 which is conductive and through the interface layers and the liquid crystal 32 on the other side.

An example of such a structure is to have a relatively thick $\gamma$-type layer 16 (a highly resistive n-type layer which is nearly intrinsic) next to the liquid crystal 23, then a pn junction 15 followed by a relatively thin p-type layer 14. Another example would be to have a $\pi$-type layer 16 (a highly resistive p-type layer which is nearly intrinsic) next to the interface layers of the liquid crystal 32. On the other side of 16 would be an n-type layer 14 forming a pn junction 15 with layer 16.

Figure 3:
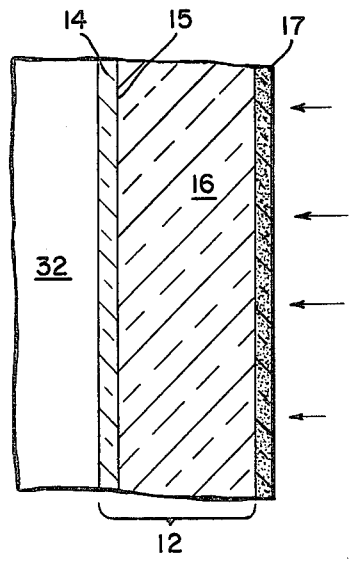
FIG. 3 is another embodiment of the present invention that has the pn junction relatively close to the liquid crystal and the resistive side towards the incoming radiation.

In FIG. 3, there is shown another embodiment of the present invention in the form of a photodiode structure with a different configuration. It has the relatively thin side 14 next to the liquid crystal. In this case, both sides of the diode must be depleted of all mobile carriers because the incoming signals will impinge on the relatively thick and resistive layer first. An undepleted and conductive layer 17 is added next to the resistive side 16 in order to provide an ohmic content for the biasing of the photodiode.

One such example is to have a structure with the following configuration, a liquid crystal and interface layers 32 followed by a relatively thin p-type layer 14, a pn junction 15, a relatively thick $\gamma$-type layer 16 and an n-type ohmic contact region 17. Another example is to have a liquid crystal 23 followed by an n-type thin layer 14, a pn junction 15, a relatively thick $\pi$-type layer and a p-type conductive contact region 17.

Figure 4:
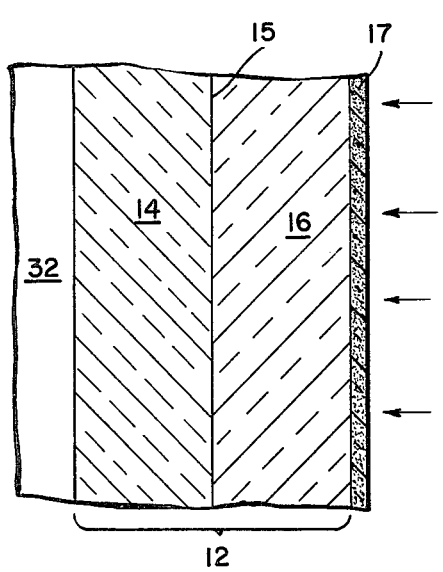
FIG. 4 is still another embodiment of the present invention with the pn junction in the middle of the photodiode.

In FIG. 4, there is shown another embodiment of the present invention in the form of a photodiode which is similar to that of FIG. 3 except that the pn junction is located somewhere close to the middle of the photodiode. Here again both sides of the photodiode have to be depleted of all mobile charge carriers during the operation of the device. One such example is to have a liquid crystal 23, followed by a $\pi$-type layer 14, a pn junction 15, an $\gamma$-type layer 16 and an n-type ohmic contact layer 17. Another example is to have a liquid crystal and interface layers 32, followed by a $\gamma$-type layer 14, a pn junction 15, a $\pi$-type layer 16 and a p-type conductive ohmic contact layer 17.

While the invention has been described in connection with preferred embodiments and certain applications in liquid crystal light valves, it will be understood that the invention is not limited to those particular embodiments or structures depicted in the drawings. On the contrary, it is intended to cover all alternatives, modifications and equivalents, as may be included within the spirit and scope of the invention as defined by the appended claims.

What is claimed is:

1. A silicon photodiode substrate for use as an image input means for an electro-optical display medium comprising:
   (a) a semiconductor body having therein first and second semiconductor layers of opposite conductivity type forming a continuous rectifying junction therein;
   (b) means for establishing in said semiconductor body a uniform electric field by reverse biasing said rectifying junction wherein the value of said electric field and the thickness of said first and second semiconductor layers and the conductivities of said first and second layers are selected to deplete said first and second semiconductor layers of substantially all charge carriers so that optically generated charge carriers move through said depletion region under the influence of said electric field with a minimum of lateral spread; and
   (c) an electro-optical display medium formed adjacent said semiconductor body to receive said optically generated charge carriers from said semiconductor body.

2. In a liquid crystal light valve having an insulating substrate, a liquid crystal and its associated light blocking layers, the improvement which comprises a silicon substrate having first and second layers forming a continuous rectifying junction therein, means for reverse biasing said rectifying junction and establishing an electric field in said silicon substrate sufficient to deplete said substrate of mobile charges so that photoactivated charge carriers representing signals are propelled through said silicon substrate under the influence of said field without substantial lateral spreading to said light blocking layers and said liquid crystal.

3. A method for transferring a plurality of signals in the form of minority charge carriers to a light modulated display medium while maintaining signal spatial resolution comprising the steps of:
  (a) forming within a silicon substrate a layer having a resistivity over 2000 ohm-cm adjacent said light modulated display medium;
  (b) establishing an electric field within said substrate sufficient to deplete at least said layer within said substrate of mobile charge carriers; and
  (c) injecting signals in the form of charge carriers in one side of said substrate opposite said display medium so that said carriers will drift under the influence of said electric field without substantial lateral spreading to said display medium on said opposite side.

4. A liquid crystal light valve structure comprising:
  (a) a semiconductor substrate;
  (b) a liquid crystal layer adjacent said substrate;
  (c) interface means between said liquid crystal layer and said semiconductor substrate for preventing light from entering said substrate through said liquid crystal layer and for reflecting said light; and
  (d) means for establishing in said substrate an electric field forming a charge depletion region through which signals representing charge carriers transfer through said substrate under the influence of said electric field without substantial lateral spreading to reach and activate said liquid crystal layer.

5. A liquid crystal light valve comprising:
  (a) a silicon semiconductor substrate having first and second major surfaces;
  (b) a continuous p-n junction formed within said substrate having contiguous first and second semiconductor layers of opposite conductivity types, the outer surfaces of said first and second layers respectively being said first and second major surfaces of said substrate;
  (c) means for reverse biasing said junction to establish an electric field in said substrate transverse to said major surfaces wherein the value of said electric field, and the resistivities and the thicknesses of said first and second layers are selected to create a depletion region extending across substantially the entire thickness of said substrate;
  (d) means for introducing optically generated charge carriers into said substrate so that said carriers move through said depletion region under the influence of said electric field and reach said second major surface without substantial lateral spreading; and
  (e) a liquid crystal layer adjacent said second major surface of said substrate for receiving said optically generated charge carriers from said substrate.

6. The device of claim 5 wherein said first and second layers have a resistivity greater than 2000 ohm-cm.

7. The device of claim 5 wherein said second layer has a resistivity greater than 2000 ohm-cm and said first layer has a resistivity less than 1000 ohm-cm and said second layer has a thickness greater than the thickness of said first layer.

8. The device of claim 7 wherein the thickness of said first layer is less than one-sixth the thickness of said second layer.

9. The device of claim 7 wherein the thickness t of said first layer is $$t < 2L$$

in which
$$L = 2W(kT/eV)^{\frac{1}{2}}$$

where
  L = distance said charge carriers laterally spread in traversing the thickness of said substrate
  W = said thickness of said substrate
  V = reverse bias voltage
  T = temperature of said substrate
  k = Boltzman's constant
  e = electron charge.

10. A method for transferring a plurality of signals in the form of charge carriers through a semiconductor body while maintaining signal spatial resolution comprising the steps of:
  (a) providing a semiconductor substrate having two major opposite surfaces;
  (b) forming a continuous p-n junction within said semiconductor substrate;
  (c) reverse biasing said junction in order to establish within said substrate an electric field transverse to said major surfaces wherein the magnitude of said field is sufficient to create a charge depletion region extending substantially throughout the entire thickness of said substrate; and
  (d) introducing at one of said two major surfaces signals in the form of charge carriers so that said charge carriers move through said depletion region under the influence of said electric field to said opposite surface without substantial lateral spreading.

11. The method of claim 10 wherein said step of forming said p-n junction is further characterized by creating within said substrate adjacent first and second semi-conductor layers of opposite conductivity wherein both of said layers have resistivities greater than 2000 ohm-cm.

12. A method of transferring a plurality of signals in the form of charge carriers through a semiconductor body while maintaining signal spatial resolution comprising the steps of:
  (a) providing a semiconductor substrate having two major opposite surfaces;
  (b) forming a continuous p-n junction within said substrate by creating therein adjacent first and second semiconductor layers of opposite conductivity wherein said second semiconductor layer has a resistivity greater than 2000 ohm-cm and said first semiconductor layer has a resistivity less than 1000 ohm-cm and the thickness of said second layer is greater than the thickness of said first layer;
  (c) reverse biasing said p-n junction so as to establish an electric field transverse to said major surfaces wherein the magnitude of said field is sufficient to create a charge depletion region throughout the entire thickness of said second layer; and
  (d) injecting signals in the form of charge carriers at one of said major semiconductor surfaces so that said charge carriers diffuse through said first layer, cross said p-n junction, and move under the influence of said electric field through said second layer to reach said opposite major surface without substantial lateral spreading.

13. The method of claim 12 wherein said step of forming said p-n junction is further characterized by the use of said first layer having a thickness less than one-sixth the thickness of said second layer.

14. The method of claim 13 wherein said step of forming said p-n junction is further characterized by the use of said first layer having a thickness t wherein $$t < 2L$$

in which $$L = 2W(kT/eV)^{1/2}$$

where
- $L$ = distance said charge carriers laterally spread in traversing the thickness of said substrate
- $W$ = said thickness of said substrate
- $V$ = reverse bias voltage
- $T$ = temperature of said substrate
- $k$ = Boltzman's constant
- $e$ = electron charge.

15. The methods of claims 10, 11, 12, 13 or 14 further comprising the use of silicon material as said semiconductor substrate.

* * * * *